United States Patent [19]

Capper et al.

[11] Patent Number: 5,625,686

[45] Date of Patent: *Apr. 29, 1997

[54] CUSTOMER-ACCESSIBLE TEST PORT FOR NETWORK INTERFACE DEVICE

[75] Inventors: Harry M. Capper; James S. Hower, both of Harrisburg; James W. Robertson, Oberlin, all of Pa.

[73] Assignee: The Whitaker Corporation, Wilmington, Del.

[*] Notice: The term of this patent shall not extend beyond the expiration date of Pat. No. 5,420,920.

[21] Appl. No.: 587,690

[22] Filed: Jan. 17, 1996

Related U.S. Application Data

[63] Continuation of Ser. No. 442,032, May 16, 1995, which is a continuation-in-part of Ser. No. 213,137, Mar. 15, 1994, Pat. No. 5,420,920.

[51] Int. Cl.$^6$ ...................................................... H04M 1/24
[52] U.S. Cl. ........................... 379/399; 379/27; 379/397; 379/442; 439/97; 439/509; 439/535
[58] Field of Search ........................... 379/399, 442, 379/27, 397; 439/97, 509, 535

[56] References Cited

U.S. PATENT DOCUMENTS

| | | | |
|---|---|---|---|
| 4,488,008 | 12/1984 | Dellinger, et al. | 379/399 |
| 4,500,158 | 2/1985 | Dola | 439/535 |
| 4,562,311 | 12/1985 | Dola | 379/412 |
| 4,588,238 | 5/1986 | Mickelson et al. | 339/91 B |
| 4,647,725 | 3/1987 | Dellinger et al. | 329/29 |
| 4,726,787 | 2/1988 | Stüne | 439/510 |
| 4,741,032 | 4/1988 | Hampton | 379/399 |
| 4,749,359 | 6/1988 | White | 439/133 |
| 4,800,588 | 1/1989 | Poster, Jr. | 379/412 |
| 4,809,323 | 2/1989 | Collins et al. | 379/399 |
| 4,827,504 | 5/1989 | Collins et al. | 379/399 |
| 4,910,770 | 3/1990 | Collins et al. | 379/399 |
| 4,919,544 | 4/1990 | Graham | 379/399 |

(List continued on next page.)

FOREIGN PATENT DOCUMENTS

| | | |
|---|---|---|
| 0127349 | 12/1984 | European Pat. Off. . |
| 2161996 | 1/1986 | United Kingdom . |
| WOA92/04794 | 3/1992 | WIPO . |
| WOA93/23960 | 11/1993 | WIPO . |

OTHER PUBLICATIONS

Siecor Brochure, "CAC 7600 Outdoor Network Interface Device", (1990), two pages; Siecor Corporation, Keller, Texas.

Siecor Brochure, "630 and 631 Multifunction Indoor Network Interfaces", (1987), two pages; Siecor Corporation, Keller, Texas.

(List continued on next page.)

*Primary Examiner*—Thomas W. Brown
*Assistant Examiner*—Jacque M. Saint-Surin
*Attorney, Agent, or Firm*—Anton P. Ness

[57] ABSTRACT

A subscriber module (40) for a network interface device (10) having a jack (100) defining a plug-receiving cavity (102) thereinto, and having a plug (50) insertable into the jack. The plug includes a plurality of interconnecting contacts (56) disposed at a mating end (58) thereof, and the jack includes first and second contacts (106, 112) secured within the plug-receiving cavity in spaced-apart disconnected pairs. Insertion of plug (50) into jack (100) moves interconnecting contacts (56) between associated ones of first and second contacts (106, 112) to electrically interconnect them, completing otherwise unconnected circuits between the distribution cable and the subscriber premise wiring. Preferably plug (50) includes a sealing member (74) therearound to seal the mating interface when plug (50) is inserted into jack (100). Conductors (36) of the premise wiring are terminable by insulation displacement techniques to terminals (164) using a stuffer cap (152), with terminals (164) connected to second contacts (112) by traces of circuit board (170) mounted within module (40), while first contacts (106) are electrically connected by other traces of board (170) to conductors (38) connected to the distribution cable.

3 Claims, 7 Drawing Sheets

U.S. PATENT DOCUMENTS

| | | | |
|---|---|---|---|
| 4,932,051 | 6/1990 | Karan et al. | 379/399 |
| 4,945,559 | 7/1990 | Collins et al. | 379/399 |
| 4,945,560 | 7/1990 | Collins et al. | 379/399 |
| 4,949,376 | 8/1990 | Nieves et al. | 379/399 |
| 4,952,170 | 8/1990 | Pritulsky | 439/509 |
| 4,979,209 | 12/1990 | Collins et al. | 379/399 |
| 5,106,306 | 4/1992 | Ditzig | 439/26 |
| 5,153,910 | 10/1992 | Mickelson et al. | 379/399 |
| 5,207,583 | 5/1993 | DeBalko et al. | 439/49 |
| 5,260,994 | 11/1993 | Suffi | 379/399 |
| 5,291,553 | 3/1994 | Smith | 379/399 |
| 5,295,865 | 3/1994 | Endo et al. | 439/587 |
| 5,297,199 | 3/1994 | Graham et al. | 379/399 |
| 5,312,266 | 5/1994 | Daoud | 439/304 |
| 5,317,474 | 5/1994 | Capper et al. | 361/119 |
| 5,333,193 | 7/1994 | Cote et al. | 379/399 |
| 5,359,654 | 10/1994 | Jensen et al. | 379/397 |

OTHER PUBLICATIONS

Siecor Brochure, "CAC 3000 Outdoor Network Interface", (1988), two pages;Siecor Corporation, Keller Texas.

Siecor Brochure, "MLP600 Series", (1989), two pages; Siecor Corporation, Keller, Texas.

Siecor Brochure, "CAC 1000 and 1001 Outdoor Network Interfaces", (1987), two pages; Siecor Corporation, Keller, Texas.

Keptel Brochure, "SNI–1500 Indoor Network Interface", (1989), two pages; Keptel, Inc., Tinton Falls, New Jersey.

Keptel Brochure, "INI–1900 Indoor Network Interface System", (1989), two pages; Keptel, Inc., Tinton Falls, New Jersey.

Keptel Brochure, "SNI–1212 Network Interface System", (date unknown), one page; Keptel, Inc., Tinton Falls, New Jersey.

Keptel Brochure, "SNI–4600", (1988), two pages; Keptel, Inc., Tinton Falls, New Jersey.

Keptel Brochure, "SNI–8925 25 Line Indoor Netwrok Interface", (1989), two pages; Keptel, Inc., Tinton Falls, New Jersey.

International Search Report dated May 31, 1995 in PCT Application corresponding to parent application Ser. No. 08/213,137.

Search Report dated Aug. 10, 1995 in corresponding Greek application.

*Keptel Brochure,* "Installation Instructions, Line Interface Module IV Jumping Jack", one sheet, containing notation May 1994; Keptel, Inc., Tinton Falls, NJ.

One photograph, "Line Interface Module IV", Part No. 91734–00; product of Keptel, Inc., Tinton Falls, NJ.

CUSTOMER-ACCESSIBLE TEST PORT FOR NETWORK INTERFACE DEVICE

RELATED APPLICATION INFORMATION

This is a continuation of U.S. patent application Ser. No. 08/442,032 filed May 16, 1995, in turn which is a continuation-in-part of U.S. patent application Ser. No. 08/213,137 filed Mar. 15, 1994, now U.S. Pat. No. 5,420,920.

FIELD OF THE INVENTION

The present invention is directed to telephone network interface devices and more particularly to customer-accessible modules thereof.

BACKGROUND OF THE INVENTION

Network interface devices provide limited access by a subscriber or customer for testing by the subscriber of the subscriber premises wiring, at a telephone junction box where the subscriber premises wiring is connected to the telephone company distribution cable. Such junction boxes are also fully accessible to service personnel of the telephone company after installation. One such network interface device is disclosed in U.S. Pat. No. 4,979,209 for a plurality of subscribers, wherein an enclosure includes a primary lid extending over the entire enclosure and securable by service personnel, and a secondary lid over the subscriber-accessible portion of the enclosure securable by the subscribers; such enclosures commonly provide access to the subscriber-accessible portion by service personnel but the subscriber-accessible portion remains secured against unauthorized persons. Individual modules within the subscriber-accessible portion are disclosed to include individual security covers such that each subscriber module is secured against access by the other subscribers.

The individual subscriber module includes a test port or jack electrically connected to both the premises wiring and the subscriber-dedicated wiring of the telephone company's distribution cable, enabling the subscriber to remove the port cover and insert the plug of a telephone or other test device to discover the location of a fault disrupting the subscriber's service. Successful connection of the telephone or test device indicates that the fault lies in the premises wiring and thus is the responsibility of the subscriber, whereas an unsuccessful connection of the telephone or test device indicates that the fault lies in the wiring of the telephone company. The performance of such testing by the subscriber enables the subscriber to first determine the location of the fault prior to arranging with the telephone company for a service call, thus saving subscriber the expense of a telephone company service call when the fault lies in the premises wiring.

Prior art test ports have been of the type including a conventional telephone plug connector having an array of two or four contacts matable with contacts in the jack, with the plug's contacts affixed to conductor wires extending from the plug and connected to the premises wiring. Deterioration of the conductor wires extending from the plug has frequently occurred from removal and replacement of the plug from and into the jack, or from exposure of the conductors to inadvertent damage by tools during installation or servicing or testing or otherwise. Occasionally problems of exposure of the contacts in the jack to moisture have also occurred, necessitating service and repair to the subscriber module.

It is desired to provide a subscriber module that eliminates the susceptibility of conductor wires to damage, and the corrosion of contact surfaces in the jack by moisture.

SUMMARY OF THE INVENTION

In the present invention, a subscriber module includes a plug having an array of interconnecting contacts along the mating face that are not connected to conductor wires, but in essence is a shunt. The plug is preferably secured to the module by a nonconducting lanyard such as a strand of high strength flexible plastic, and includes a manually grippable portion extending from the plug at the end opposite the mating face, for manipulation of the plug during removal from the jack and replacement thereinto. A sealing member of elastomeric material is provided in a groove around the plug that deformingly engages side walls of the jack when the plug is fully inserted into the jack, thus providing assured sealing of the mating interface between the plug and jack.

The jack provides spaced pairs of contacts at the mating face associated with each contact of the plug array and that are by themselves not electrically joined, defining an intentional gap in the connection between the distribution cable wiring and the premises wiring, with ones of each contacts of the several pairs being electrically connected to conductors of the distribution cable and others of each contacts of the several pairs being electrically connected to conductors of the premises wiring, all completely housed within the module. Upon the plug being secured in the test port or jack, its interconnecting contacts provide an assured electrical connection between the otherwise unconnected associated contacts of the pairs of jack contacts and enabling telephone service to be established between the distribution cable and the premises wiring.

It is an objective of the present invention to provide a subscriber test port of a subscriber module that seals the mating interface against moisture when a test is not being conducted.

It is also an objective to provide a plug that does not require conductors that are susceptible to damage by being exposed or require manipulation during removal and reinsertion of the plug.

It is a further objective to provide a subscriber module that includes the capability of placement of testing or other components sealed within the module without requiring modification to the module housing.

An embodiment of the present invention will now be described by way of example with reference to the accompanying drawings.

DETAILED DESCRIPTION OF THE PREFERRED EMBODIMENT

Figure 1:
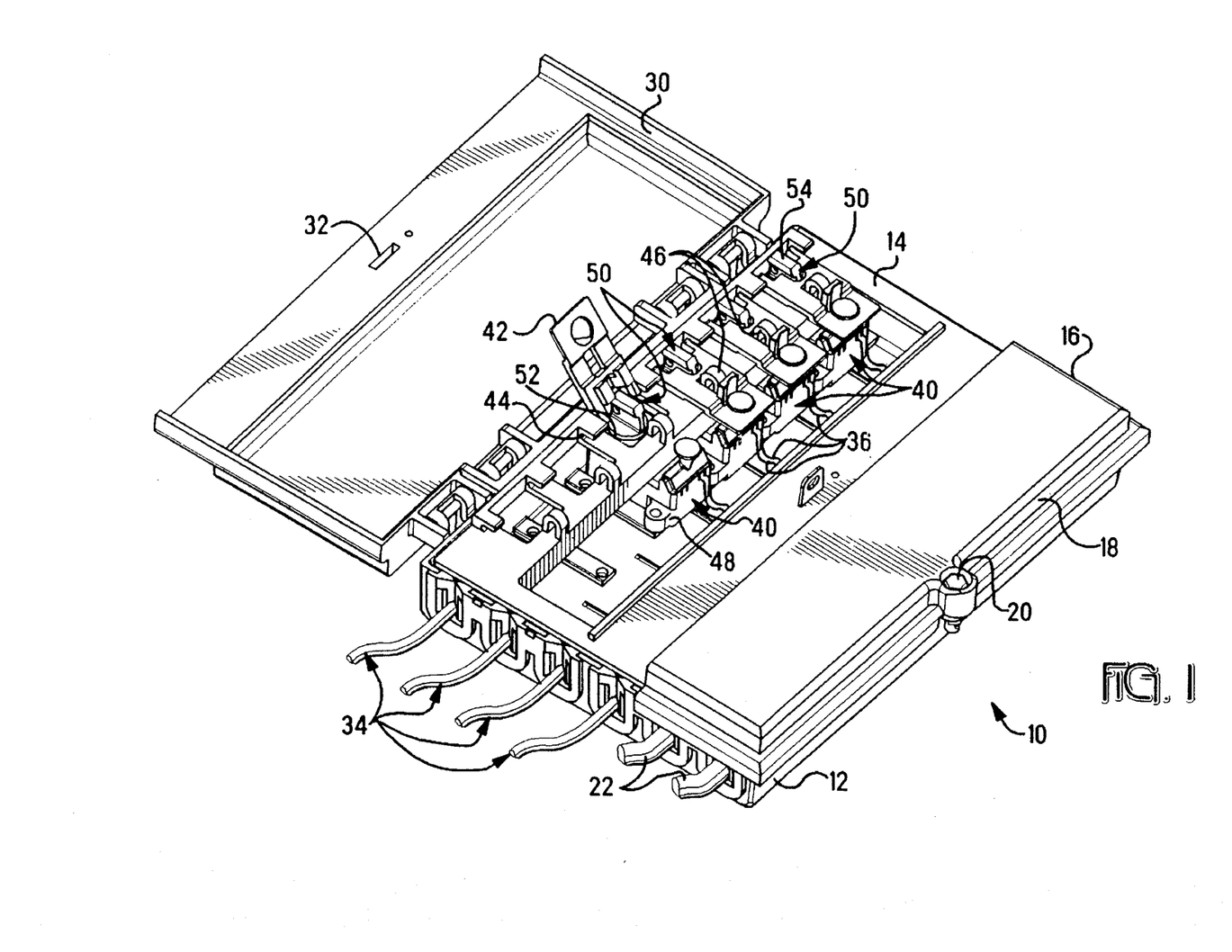
FIG. 1 is an isometric view of a network interface device with the primary lid closed and the secondary lid opened illustrating the subscriber portion containing an array of subscriber modules containing the present invention.

In FIG. 1 is shown network interface device 10 comprising an enclosure 12 having a subscriber portion 14 and a telephone company portion 16, with the enclosure 12 having a primary lid 18 secured at lock 20 to prevent access by non-service personnel to portion 16. A pair of distribution cables 22 are shown extending from portion 16. Secondary lid 30 is shown in the opened position and includes a lock 32 for being secured to primary lid 18 when closed, with an array of subscriber modules 40 mounted within subscriber portion 14. Individual subscriber cables 34 are shown extending from subscriber portion 14 of enclosure 12 that extend into the premises of the customer or subscriber, and the conductors 36 of each subscriber cable are electrically connected to circuits within an associated subscriber module 40 mounted in subscriber portion 14 of enclosure 12.

Security covers 42 are seen in their open positions and are pivotally mounted at hinges 44 to respective modules 40 to be rotated to a closed position and thereafter locked if desired by the respective subscriber at lock locations 46, such as by using conventional Size 10 padlocks.

Each module 40 includes a cable face 48 for connection of ends of conductors 36 of subscriber cables 34 to terminals within the module, and also provides electrical connections to conductors 38 extending to telephone company portion 16 for connection to conductors of a distribution cable 22. A plug 50 is affixed to module 40 such as by a lanyard 52 and includes a tab portion 54 extending upwardly from the module enabling manual gripping for removal of the plug from its respective jack.

Figure 2:
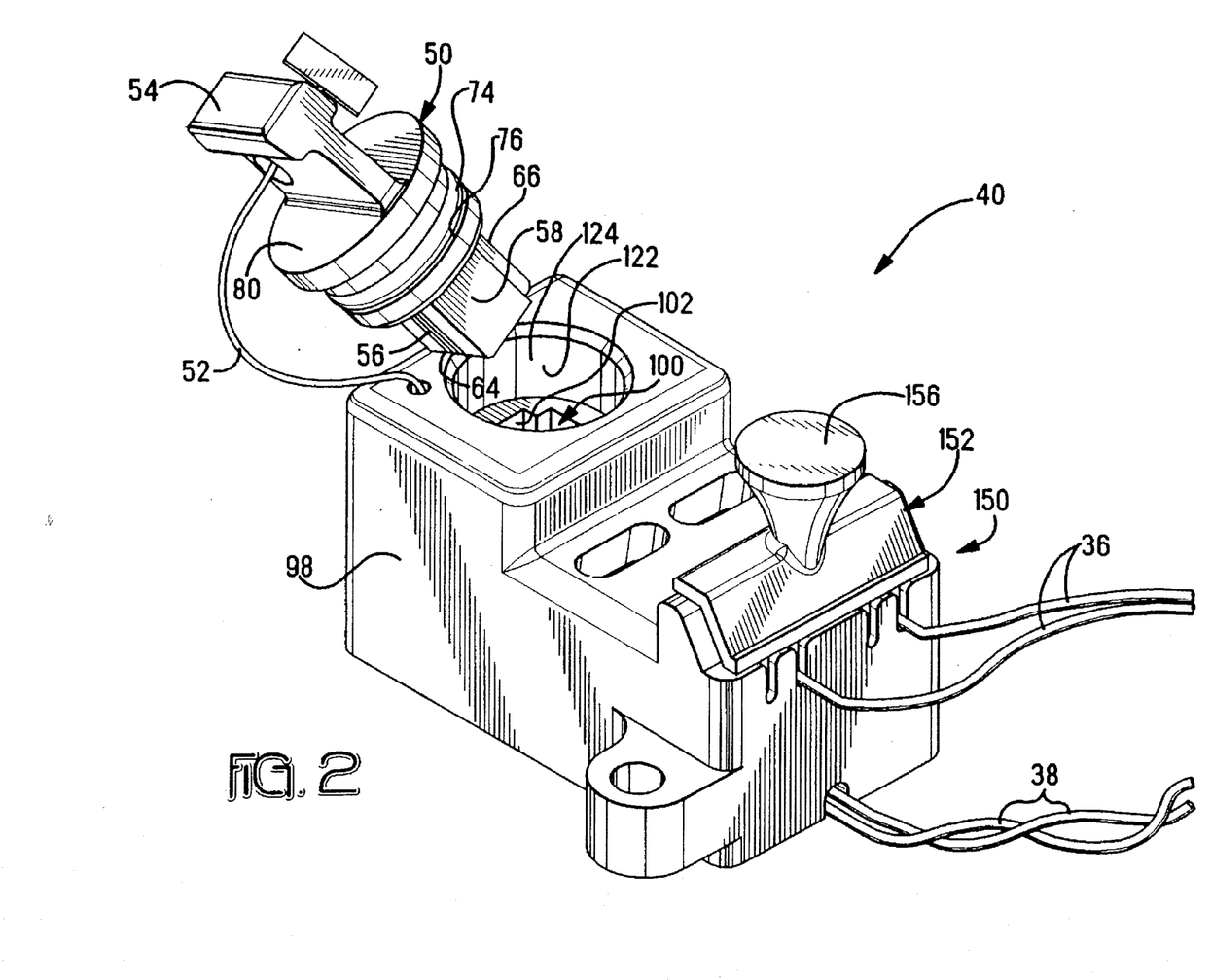
FIG. 2 is an isometric view of a subscriber module with the plug removed from the jack and showing conductors extending to the module from premise wiring and from a distribution cable.
Figure 3:
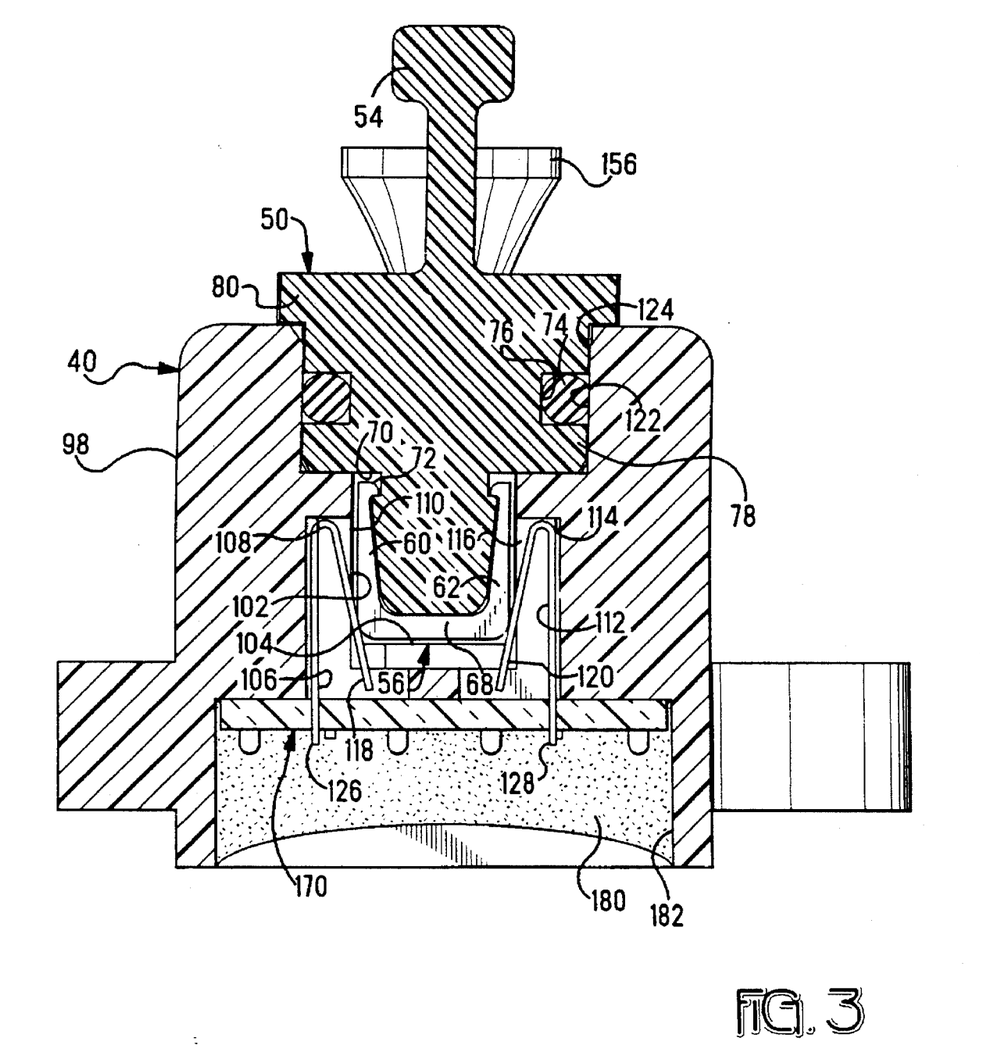
FIG. 3 is a cross-sectional view of the plug fully inserted within the jack and an interconnecting contact interconnecting a pair of contacts therein.

Referring now to FIGS. 2 and 3, plug 50 is shown to have a polarized mating end 58 as is conventional with plug connectors in use in the telephone industry to connect telephones to premise wiring at conventional jacks having complementarily shaped plug-receiving cavities. Plug 50 is formed of dielectric material such as thermoplastic resin, and is seen to have four interconnecting contacts 56 affixed to mating face 58 at a mating end of the plug and including contact sections 60, 62 along side surfaces 64,66 connected by a body section 68. Interconnecting contacts 56 are seen disposed within corresponding grooves 70 secured therein such as by barbs 72 at ends of contact sections 60, 62. Spaced rearwardly from mating face 58 is an elastomeric sealing member 74 such as an O-ring seated in a groove 76 extending around intermediate section 78. Plug 50 also includes an enlarged diameter cover flange 80 to traverse and close the opening to jack 100.

Jack 100 is defined by dielectric housing 98 of module 40 and includes a plug-receiving cavity 102 with a mating interface adjacent bottom 104 of the cavity. First contacts 106 are arrayed in respective grooves 108 along a first side 110 and second contacts 112 in grooves 114 along a second side 116, all having cantilever beam contact arms 118, 120 associated with contact sections 60, 62 of interconnecting contacts 56 of plug 50, extending toward cavity bottom 104 at angles into plug-receiving cavity 102 in opposed pairs to become electrically engaged by interconnecting contacts 56 and thus become interconnected to complete respective circuits upon full insertion of plug 50 into cavity 102.

Annular surface portion 122 of enlarged diameter cavity portion 124 is engaged by sealing member 74 of plug 50 upon full insertion to define an environmental seal protecting the mating interface at the bottom of cavity 102. A friction fit of O-ring 74 against surface portion 122 is sufficient to retain plug 50 within jack 100 without a latching arrangement. Plug-receiving cavity 102 and contacts 106, 112 therein define a test port for receipt of a plug for testing of the circuits of the subscriber premise wiring and the distribution cable, and with plug 50 fully inserted thereinto is sealed.

First contacts 106 include posts 126 extending through holes of circuit board 170 for soldering to associated traces (not shown) of board 170, and second contacts 110 similarly include posts 128 in holes of board 170 and are soldered to other traces of board 170.

Figure 4:
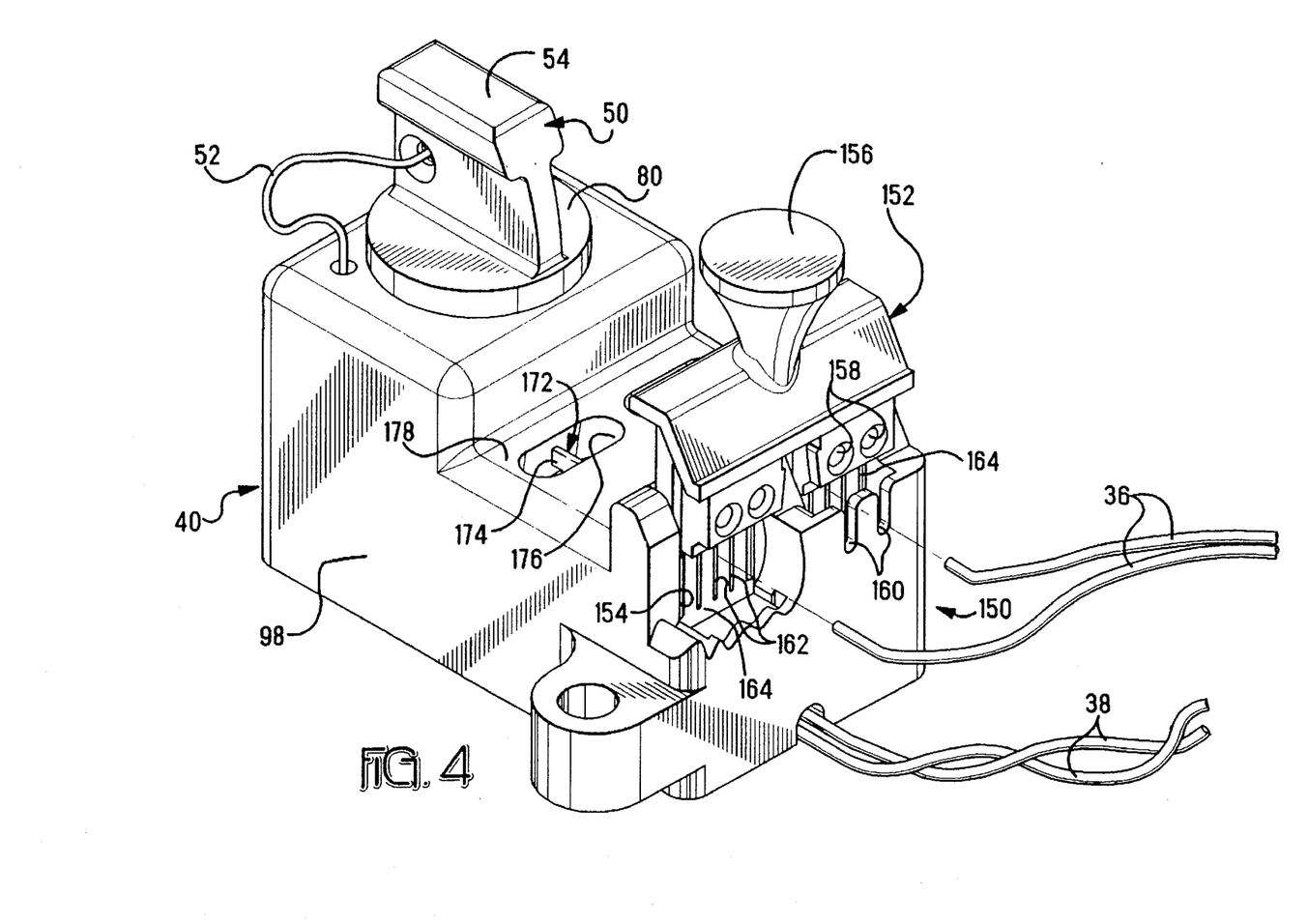
FIG. 4 is an isometric view of the plug in place within the jack and a stuffer cap lifted to its open position for termination of subscriber wiring.

In FIG. 4, wire termination section 150 is seen to include a stuffer cap 152 disposed within a slot 154 and movable vertically between a pretermination or open position, and a termination or closed position, and that includes a grippable section 156 to be manipulated. Stuffer cap 152 is shown to have four wire-receiving sections 158 for receipt thereinto of ends of respective conductors 36 when in the open position, whereafter movement to the closed position moves the wires into support slots 160 of housing 98 and into insulation displacement slots 162 of terminals 164 in a manner generally conventionally known. Terminals 164 include post sections 166 and are mounted on a circuit board 170 traversing the bottom of module 40 (best seen in FIG. 5) and are electrically connected to respective traces thereon.

On circuit board 170, the traces from terminals 164 extend to respective ones of second contacts 112 of jack 100 and electrically connected thereto, thus completing circuits from the second contacts 112 to conductors 36 of the subscriber cable 34. Additional traces extend from first terminals 106 to terminations with conductors 38 that extend into telephone company portion 16 of network interface device 10 for connection to distribution cables 22. Preferably probe contacts 172 (FIG. 5) have post sections and are mounted onto circuit board 170 joined to selected traces thereof and extending to exposed contact sections 174 within recesses 176 along accessible surface 178 of module 40 for testing by service personnel.

Figure 6:
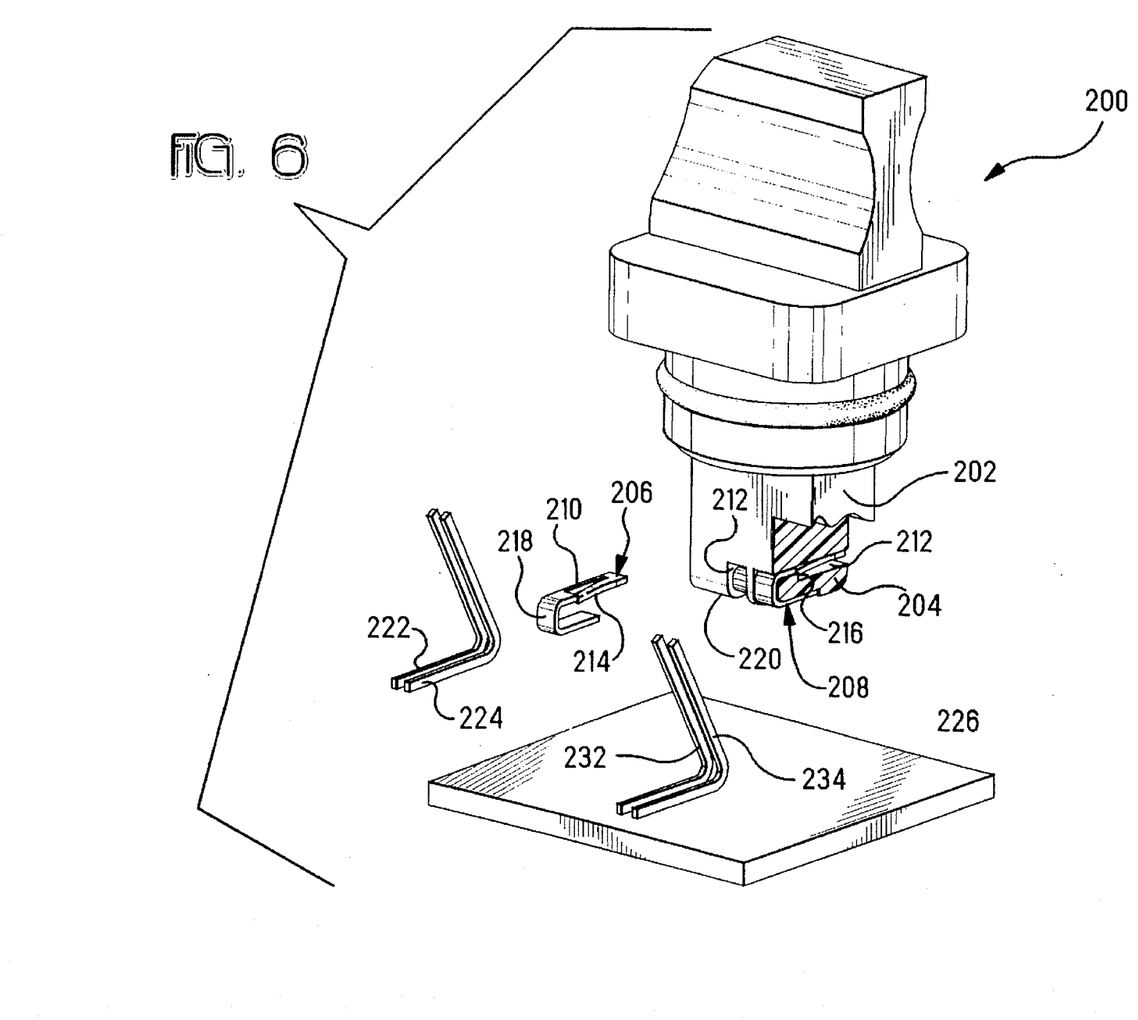
Figure 7:
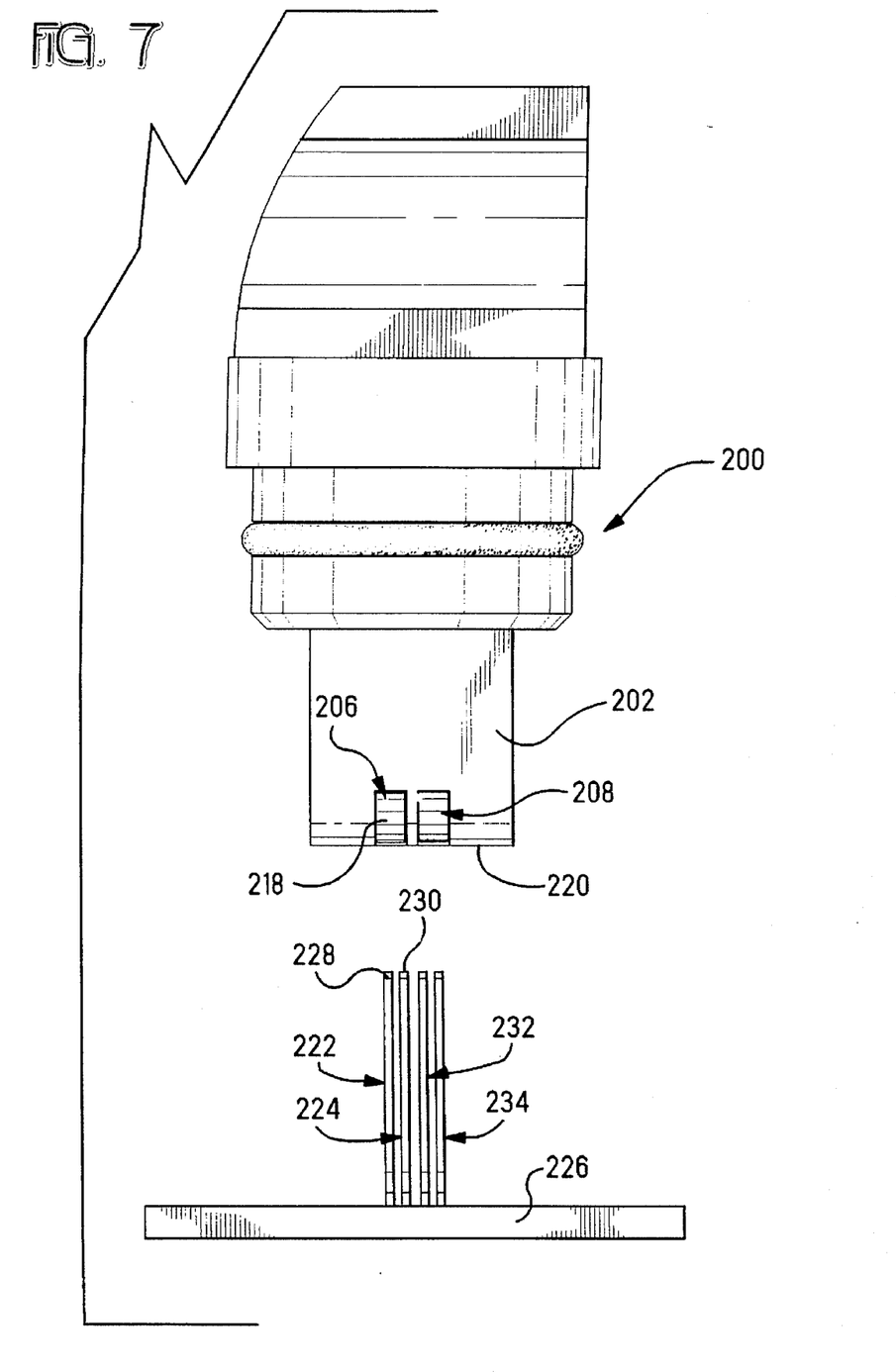

Another embodiment of the present invention is shown in FIGS. 6 and 7. Plug connector 200 includes a plug portion 202 having at its end 204 a pair of interconnecting contacts 206, 208 securable thereto. Each interconnecting contact 206, 208 includes a body portion 210 insertable into a complementary cavity 212 extending into plug portion 202, and body portion 210 includes a locking lance 214 that latches behind a ledge 216 along a side wall of cavity 212 upon full contact insertion to prevent interconnecting contact 206, 208 from dislodging. Contact section 218 is exposed, preferably in a shallow groove, along a side surface of plug portion 202 and continuing exposed along mating end 220 thereof for engagement with an associated pair of contacts 222, 224 of the jack (not shown) into which plug connector 200 is inserted, with contacts 222, 224 mounted side-by-side onto a circuit board 226. First contact 222 may be connected to the subscriber premise wiring while second contact 224 may be connected to a circuit of the distribution cable, both being associated with either the tip or ring circuit for the subscriber, with side-by-side contacts 222, 224 otherwise unconnected to each other until engaged by the contact section 218 of interconnecting contact 206. Contact section 218 of interconnecting contact 206, for example, has a width great enough to span the distance comprising the spacing between contacts 222, 224 associated with interconnecting contact 206 and assuredly engage the deflectable spring arms 228, 2230 of the pair of contacts 222, 224 but not great enough to inadvertently engage a third contact such as contact 232. Interconnecting contact 208 likewise will interconnect side-by-side contacts 232, 234 such as for the other one of the tip or ring circuits.

It is desired that conductors 38 are connected to associated conductors of the cable in the telephone company portion 16 of the network interface device, by means of protector modules (not shown) such as are disclosed in U.S. Pat. No. 5,317,474. Such protector modules establish protection against surges of voltage and current along the circuits thus protecting equipment from damage.

Figure 5:
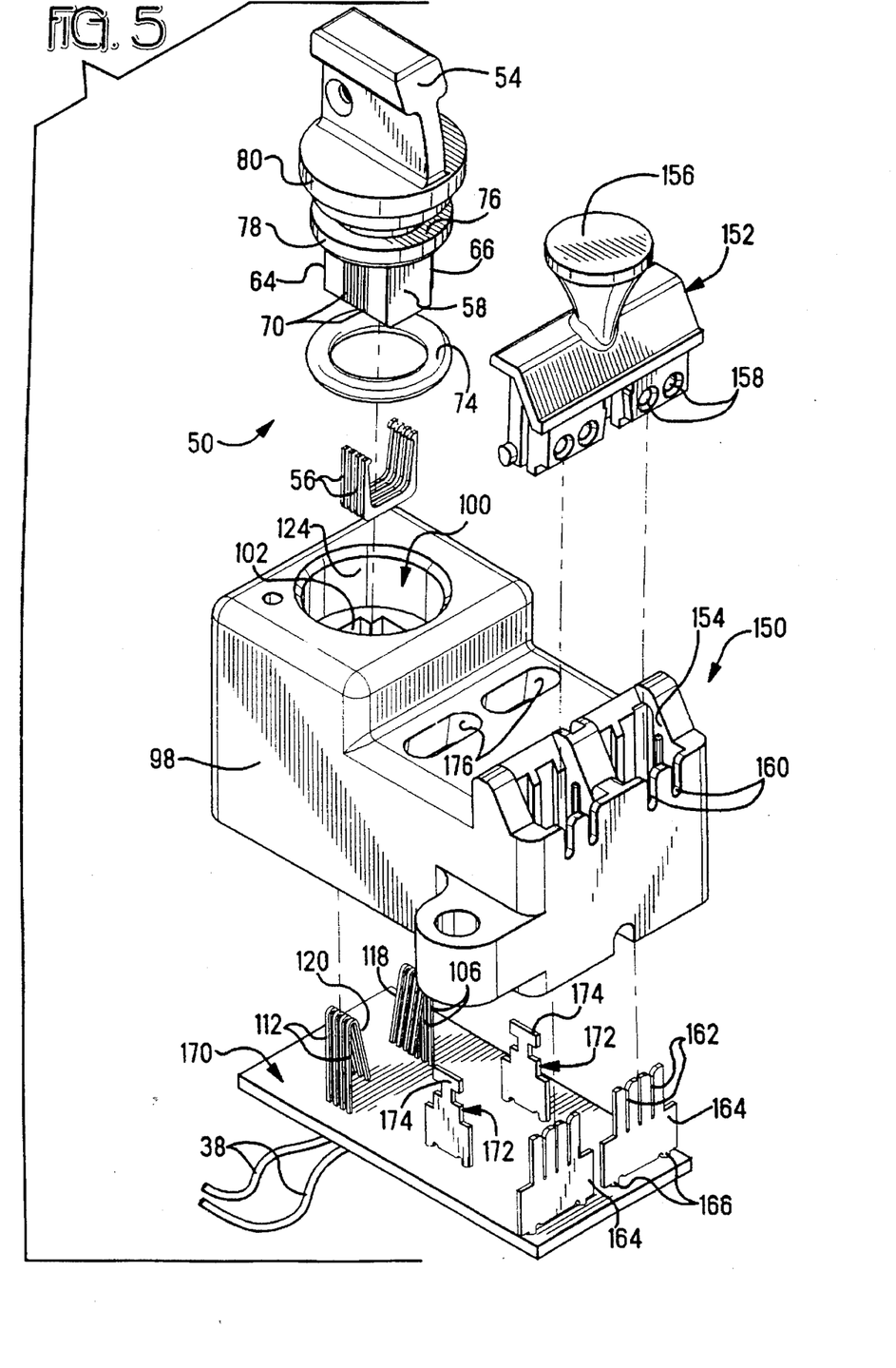
FIG. 5 is an isometric exploded view of the module of FIGS. 1 to 4 showing the circuit board with contacts and terminals mounted thereto and FIGS. 6 and 7 are an exploded isometric view and an exploded elevation view of an alternate embodiment of the present invention wherein each interconnecting contact of the plug interconnects a pair of side-by-side contacts, with a portion of the plug broken away in FIG. 6.

Preferably upon assembly of module 40 with contacts 106, 112 and terminals 164 mounted onto circuit board 170, and termination of conductors 38 to traces of circuit board 170, potting material 180 is disposed along the outwardly facing surface of the circuit board within board-receiving recess 182 into the bottom face of module 40, thus environmentally sealing the electrical connections within module 40.

One aspect of the present invention is circuit board 170 within a subscriber module 40, that enables utilization of additional electrical or electronic components within the module, such as a maintenance test unit (not shown), or a half-ringer enabling computer polling of subscriber lines to the module for fault-free verification even in the absence of a telephone unit properly connected to premise wiring within the premises.

Variations and modifications can be devised to the embodiment of the invention disclosed herein, that are within the spirit of the invention and the scope of the claims.

What is claimed is:

1. A test port of a subscriber module of a network interface device wherein conductors of distribution cable are connected to conductors of premise wiring of a subscriber of telephone service, comprising:

a jack including a plug-receiving cavity and an array of contact members exposed for engagement at a mating interface within said plug-receiving cavity;

a plug member insertable into and removable from said plug-receiving cavity and including an array of interconnecting contact members exposed to be engageable with said jack contact members, with said plug member removable from said jack to permit insertion of another plug member for testing;

said contact members of said jack are arranged in associated pairs of first and second contact members adjacent said mating interface and having respective contact sections exposed along said mating interface in said plug-receiving cavity, and said first and second contact members being electrically unconnected to each other when said plug member is unmated from said jack, one of said first and contact members of each said pair being connected to a circuit extending to a distribution cable and the other thereof being connected to a circuit extending to premise wiring of a subscriber of telephone service; and said contact members of said plug member being unconnected to any circuit when said plug member is unmated from said jack, each said contact member including a contact section associated with a respective said pair of said contact members of said jack, defining interconnecting contacts adapted to interconnect said ones and others of said pairs of contact members of said jack when said plug member is fully inserted into said jack, thus interconnecting otherwise unconnected ones of said conductors of said distribution cable and associated conductors of said premise wiring.

2. The test port as set forth in claim 1 wherein each of said contact sections of said first and second contact members is outwardly deflectable and disposed at an angle into said plug-receiving cavity prior to engagement and deflection outwardly by a said contact section of a corresponding said interconnecting contact of said plug.

3. A test port of a subscriber module of a network interface device wherein conductors of distribution cable are connected to conductors of premise wiring of a subscriber of telephone service, comprising:

a jack including a plug-receiving cavity and an array of contact members exposed for engagement at a mating interface within said plug-receiving cavity;

a plug member insertable into and removable from said plug-receiving cavity, with said plug member removable from said jack to permit insertion of another plug member for testing;

said contact members of said jack are arranged in associated pairs of first and second contact members adjacent said mating interface and having respective sections exposed along said mating interface in said plug-receiving cavity, said first and second contact members being electrically unconnected to each other when said plug member is unmated from said jack, one of said first and contact members of each said pair being connected to a circuit extending to a distribution cable and the other thereof being connected to a circuit extending to premise wiring of a subscriber of telephone service; and portions of said plug member being engageable, upon insertion of said plug member into said jack, with said exposed sections of said jack contact members to result in a respective conductive path being established between said first and second contact members of each said associated pair and the completion of circuits therebetween, thus interconnecting otherwise unconnected ones of said conductors of said distribution cable and associated conductors of said premise wiring.

* * * * *